United States Patent [19]

Woditsch et al.

[11] 4,186,028
[45] Jan. 29, 1980

[54] FLUID PIGMENT SUSPENSIONS WITH PHOSPHONOCARBOXYLIC ACIDS

[75] Inventors: Peter Woditsch; Gunther Teichmann; Gunter Linde; Gunter Lailach, all of Krefeld; Fritz Rodi, Duisburg, all of Fed. Rep. of Germany

[73] Assignee: Bayer Aktiengesellschaft, Leverkusen, Fed. Rep. of Germany

[21] Appl. No.: 911,008

[22] Filed: May 30, 1978

[30] Foreign Application Priority Data

Jun. 3, 1977 [DE]  Fed. Rep. of Germany ....... 2725210

[51] Int. Cl.² .................... C09C 1/02; C09C 1/24; C09C 1/36; C09C 1/08
[52] U.S. Cl. ..................... 106/300; 106/296; 106/302; 106/304; 106/306; 106/308 Q; 106/308 F; 106/308 N; 106/309
[58] Field of Search ............... 106/300, 308 Q, 296, 106/302, 304, 306, 309, 97; 166/293; 210/58

[56] References Cited

U.S. PATENT DOCUMENTS

| 3,346,487 | 10/1967 | Irani et al. ............... 106/308 Q X |
| 3,772,046 | 11/1973 | Knapp et al. ............... 106/300 |
| 3,808,023 | 4/1974 | Whitehead et al. ......... 106/308 Q X |
| 3,886,205 | 5/1975 | Geffers et al. ............ 260/502.4 R |
| 3,959,168 | 5/1976 | Germscheid et al. ........... 210/58 X |
| 3,964,921 | 6/1976 | Persinski ................ 166/293 X |
| 4,040,854 | 8/1977 | Persinski ................ 106/97 X |

FOREIGN PATENT DOCUMENTS 1519544  1/1972  Fed. Rep. of Germany ........... 106/300

Primary Examiner—Helen M. McCarthy
Attorney, Agent, or Firm—Sprung, Felfe, Horn, Lynch & Kramer

[57]  ABSTRACT

In an aqueous fluid dispersible filler or pigment suspension containing a dispersion aid, the improvement which comprises employing as the dispersion aid about 0.01 to 1% by weight, based on solids, of a phosphonocarboxylic acid or a salt thereof. The pigment may be $TiO_2$ and be present in from 30 to 80% concentration. The dispersion aid may be phosphonobutane-1,2,4-tricarboxylic acid or a salt, and an amine or alkanolamine may also be present.

10 Claims, No Drawings

FLUID PIGMENT SUSPENSIONS WITH PHOSPHONOCARBOXYLIC ACIDS

The production of highly concentrated aqueous pigment suspensions is known, for example from German Offenlegungsschrifts Nos. 2,237,791; 2,233,517; 2,135,535; 2,045,141 and 1,810,042. Pigment suspensions of this type, which are also called slurries, can be transported in tanks as opposed to pallets. The fact that they can be pumped provides for more rational transport in comparison with solids and makes dosage easier for the user. By virtue of the presence of satisfactorily pre-dispersed pigments in suspensions such as these, the user does not have to make any provision for dispersion.

Various dispersion aids are known for the production of suspensions having high solids content, including for example amines, alkanolamines, polyphosphates, natural or synthetic polymers, alkali salts of aminopolyphosphonic acids, and alkyl sulphonic acids. The number of compounds used as dispersion aids shows how difficult it is to solve the problem of producing slurries in order to satisfy all the requirements for pigment suspensions of the type in question. More particularly, a liquefier for pigment suspensions has to satisfy the following requirements:

- versatility in use and inexpensive production;
- no adverse effect upon pigment dispersion;
- prevention of sediments which are non-redispersible;
- compatibility with the various binders in which the pigments are used;
- no nutrient medium for fungi and bacteria;
- no pollution risk.

The present invention provides fluid, dispersible filler and pigment suspensions containing inorganic aqueous dispersion aids, wherein the suspensions contain about 0.01 to 1% by weight and preferably about 0.05 to 0.5% by weight, based on solids, of a phosphonocarboxylic acid and/or a phosphonocarboxylic acid salt.

The phosphonocarboxylic acids used in accordance with the present invention correspond to the following general formula

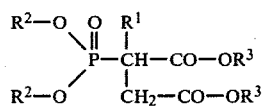

wherein
- $R^1$ is a hydrogen atom, or a linear or branched optionally substituted alkyl radical having from 1 to 4 carbon atoms, and
- $R^2$ and $R^3$ are the same or different and each is a hydrogen atom or a $C_{1-3}$-alkyl radical.

The production of compounds such as these is known, for example, from U.S. Pat. No. 3,886,205.

The phosphonocarboxylic acids added in the present invention may also be used in combination with the usual, known dispersants which results inter alia in improved properties with regard to the fluidity and sedimentation of the slurries.

In one particularly favorable embodiment of the invention, amines and/or alkanolamines are used in combination with the phosphonocarboxylic acids according to the invention. Suitable amines are, for example, alkylamines such as triethylamine, butylamine, and ethylene diamine, or alkanolamines such as, for example, diethanolamine, mono- or di-isopropanol-amines, ethanolamine, and 2-amino-2-methyl-1-propanol.

Thus, there can be employed amino substitution products of lower alkanes containing up to 4 carbon items as well as hydroxy substitution products thereof.

In cases where amines or alkanolamines are used alone for the production of slurries, extremely firm and, in some cases, solid sediments which are difficult or impossible to redisperse are generally formed after prolonged standing on account of the high degree of dispersion of the pigments. However, an addition of as little as about 0.05 to 0.2% by weight of a phosphonocarboxylic acid is sufficient to prevent sediment formation without affecting the uniform dispersion state. The amines or alkanolamines are used in quantities of from about 0.05 to 1.0% by weight, based on solids.

Particularly preferred phosphonocarboxylic acids are phosphonosuccinic acid (PSA):

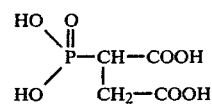

and phosphonobutane-1,2,4-tricarboxylic acid (PBA-AM):

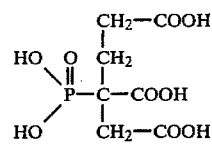

The phosphonocarboxylic acid additives according to the invention are stable to hydrolysis. Examples of pigments which are suitable in accordance with the invention for pigment suspensions of high solid content are $TiO_2$, iron oxides ($\alpha$-FeOOH, $Fe_2O_3$, $Fe_3O_4$), zinc oxides, and chromium oxide. $TiO_2$ is particularly preferred.

According to the invention, it is also possible to produce suspensions of fillers such as, for example, barium sulphate, talcum, calcium carbonate, and quartz powder.

The solids content which can be adjusted in the aqueous suspensions differs considerably according to the particle size, particle shape and specific surface of the pigments to be liquefied. Whereas it is possible to produce aqueous $TiO_2$ pigment suspensions with a solids content of up to about 80% by weight by adding phosphonocarboxylic acids, acicular and finely divided $\alpha$-iron oxide hydroxide suspensions can reach the viscosity limit with a solids content of only about 30% by weight. In the case of isometric pigments and fillers, the solids content normally aimed at is in the range of about 50 to 80% and preferably in the range of about 60 to 75%, whereas in the case of anisometric materials this range is distinctly lower at about 30 to 60%, preferably about 35 to 50%.

The solids content to be adjusted in the slurries produced in accordance with the invention is largely determined by practical considerations. Thus, the suspension obtained should show normal rheological flow properties and minimal thixotropy and rheopexy and any inherent structural viscosity should be able to be completely eliminated by light shear forces or shaking.

The properties of the highly concentrated solids suspensions are also dependent upon the pH-value of the pigment suspensions. Whereas a pH-value of less than about 6 is undesirable for various reasons in the case of pigment suspensions (reduced stability of aftertreatment layers, corrosion of packaging containers, flocculation and hence reduced optical performance, for example covering power), a pH-range of about 6 to 10 is preferred for the slurries. Where the phosphonocarboxylic acids added in accordance with the invention are used, the pH-value can be adjusted to the required pH-range by the addition of lyes such as, for example, soda lye, ammonia lye or potash lye. The required pH-range can also be attained by the addition of buffer solutions or alkaline wetting agents such as, for example, polyphosphates, $Na_3PO_4$ or amines. A pH-range from about 8 to 9 is preferably maintained.

The phosphonocarboxylic acids active in accordance with the invention may be added to the pigments or fillers in different ways in order to obtain the highly concentrated slurries. For example, it is possible in accordance with the invention to mix water containing phosphonocarboxylic acid with the pigment or filler while stirring, following the addition of a lye to adjust the required pH-range.

Other additives, such as standard preservatives, affect neither the flow properties nor the stability in storage of the pigment suspensions produced in accordance with the invention.

In another embodiment, the phosphonocarboxylic acid may be added before drying after a known inorganic aftertreatment of $TiO_2$-pigments. After drying and grinding, the $TiO_2$ obtained shows a high wetting power for water and can be converted particularly easily to a highly concentrated pigment suspension containing up to 80% by weight of $TiO_2$. Other possible applications of the phosphonocarboxylic acids include the treatment of pigments with these compounds before or during grinding, or the separate addition of pigment and liquefier to the aqueous phase initially introduced.

In one particularly preferred embodiment, filter cakes normally difficult to transport in view of their relatively high solids contents (about 25 to 60%) are "liquefied" by the addition of phosphonocarboxylic acids and are transported in this form, for example to a following drying or calcining unit. In this way, it is possible to save energy costs.

The invention is illustrated by the following examples:

EXAMPLE 1

A standard commercial-grade titanium dioxide pigment (anatase structure) aftertreated with 3% by weight of aluminum oxide was ground and converted into an aqueous suspension with various surface-active compounds. The adjusted solids content amounted to 72% by weight to keep the water content as low as possible. The following compounds were used as dispersants:
2-amino-2-methyl-1-propanol (AMP)
2-phosphonobutane-1,2,4-tricarboxylic acid (PBA-AM) and a mixture of mono- and di-isopropanolamine.

Where necessary, the pH-values were adjusted by the addition of small quantities of soda lye.

The corresponding quantity of water was initially introduced into a vessel with the dispersant, followed by the introduction in portions of the $TiO_2$-pigment while stirring at 2000 rpm. After all the pigment had been introduced, stirring was continued slowly for another 10 minutes and the viscosity measured by means of a 4 mm DIN cup. This viscosity test was carried out in accordance with DIN 53 211 using a 4 mm orifice DIN cup, the flowout time for water at 20° C. being 10–11 seconds. To test stability in storage, the tendency of the suspension to form sediments was quantitatively assessed. To this end, 300 g batches of the solids suspension were weighed into 300 ml polyethylene beakers and were tested after certain intervals. The test was carried out by turning the polyethylene beaker so that its opening points downwards and its axis forms an angle of 45° with the horizontal. The beaker was left for 5 minutes in this position so that the liquid component could flow out. The non-fluid residue left in the beaker was then weighed and classed as sediment.

The testing of the various wetting agents is summarised in Table 1.

| Dispersant | Quantity % | pH-Value | Flow-out time DIN cup (seconds) | Density g/cc | Sediment after 5 days g | 12 days g |
|---|---|---|---|---|---|---|
| 2-amino-2-methyl-1-propanol | 0.2 | 10.0 | 12.5 | 1.94 | 300 | 300 |
| monodiisopropanol-amine | 0.1 | 9.3 | 17.5 | 1.94 | 300 | 300 |
| monodiisopropanol-amine + 2-phosphonobutane tricarboxylic acid | 0.1 } 0.1 | 9.0 | 12.0 | 1.95 | 28 | 57 |
| 2-phosphonobutane-tricarboxylic acid | 0.1 | 9.0 | 13.5 | 1.96 | 14 | 23 |

It is clear from the tests that the stability in storage of the solids suspensions is considerably improved and that storable solids suspensions of aftertreated anatase pigments are only obtained by adding the 2-phosphonobutane-1,2,4-tricarboxylic acid according to the invention.

EXAMPLE 2

The fluidity of iron oxide yellow and black pastes can be improved by using suitable chemical additives so that a higher solids content can be obtained. The effectiveness of the additives can be assessed from viscosity measurements. The flowout beaker according to DIN 53 211 is suitable for this purpose. In many cases, however, this method cannot be applied because $\alpha$-FeOOH is an acicular pigment. On account of the geometry of the needles, the individual pigment particles are entangled with one another so that the hydrostatic pressure of the liquid column is not sufficient to cause the suspension to flow out. Even in the case of $Fe_3O_4$, the hydrostatic pressure is often not sufficient although the particles are isometric. In the case of $Fe_3O_4$, magnetic forces between the particles prevent complete flow-out from the beaker at a certain viscosity level.

When the simple and rapid laboratory method using the flowout beaker is not applicable, a viscosity curve has to be established, for example by using a rotary viscosimeter. Comparisons of the effectiveness of various additives can be made from viscosity curves.

Unfortunately, this method is time consuming and expensive. Accordingly, the quantity by weight delivered per unit of time (2 minutes) by a feed screw was selected as a measure of the effectiveness of the liquefiers for the laboratory tests. This test has the additional advantage that the results can be more effectively converted to the technical and commercial scale, for example for transporting the sludges accumulating during production.

A glass screw approximately 220 mm long was rotated at constant speed (50 rpm) in a glass tube having an internal diameter of 18 mm. The suspension was directly delivered from a storage vessel to the screw which was joined at its end to a tube 6 mm in diameter and 40 mm long.

During the production of the pastes, corresponding rotary filter sludges were initially introduced in portions of 400 g into a 400 ml glass beaker along with the corresponding quantity of additive. Mixing was carried out for 10 minutes using a helical stirrer (diameter 6 cm, height 4 cm, 2 turns). The rotation speed was between 500 and 1250 rpm, depending on viscosity.

In the liquefaction of a standard commercial-grade iron oxide black pigment filter cake with a solids content of 65%, the following quantities of paste in g were passed every 2 minutes through the described feed screw:

Table 2

| Liquefier | Quantity added % | Throughput g/2 mins |
|---|---|---|
| Salt of a polycarboxylic acid | 0 | 2 |
| | 0.1 | 35 |
| | 0.5 | 98 |
| | 2.0 | 101 |
| Condensation product of formaldehyde with ditolyl ether sulphonic acid | 0.1 | 12 |
| | 0.5 | 20 |
| | 2.0 | 70 |
| Alkanol sulphonate/polyglycol ether | 0.1 | — |
| | 0.5 | 20 |
| | 2.0 | 116 |
| PBA-AM pH = 9 | 0.1 | 6 |
| | 0.5 | 112 |
| PBA pH = 9 | 0.5 | 70 |

It was found that, where PBA and PBA-AM are used, throughput is considerably increased, depending on the pH-value, to an extent which, with some other products, is only obtained by adding larger quantities.

The following results were obtained in the liquefaction of $\alpha$-FeOOH-pigment filter cakes:

Table 3

| Solids content % $\alpha$-FeOOH | Liquefier | Quantity added % | Throughput g/2 mins. | Flowout time from 4 mm DIN cup (seconds) |
|---|---|---|---|---|
| 25 | — | — | 27 | — |
| 29 | — | — | 11 | — |
| 25 | salt of a polycarboxylic acid | 0.1 | 38 | — |
| | | 0.5 | 61 | — |
| | | 2.0 | + | 12.3 |
| 25 | condensation product of formaldehyde and ditolyl ether sulphonic acid | 0.1 | 42 | — |
| | | 0.5 | 47 | — |
| | | 2.0 | 56 | — |
| 29 | PBA-AM pH = 3 | 0.5 | 81 | |
| | pH = 5 | 0.5 | + | |
| | pH = 7 | 0.5 | + | 11.3 |
| | pH = 9 | 0.5 | + | |
| 29 | PBA pH = 5 | 0.5 | 78 | |
| | pH = 7 | 0.5 | 97 | |
| | pH = 9 | 0.5 | + | |
| 25 | lignin sulphonate | 2.0 | | 18.7 |
| | Na-metaphosphate | 2.0 | | 16.7 |

+ too thinly liquid
− too thick

In the case of $\alpha$-FeOOH-pigment suspensions, it is also possible by using PBA and PBA-AM to obtain a distinct improvement in throughput and a reduction in flowout time in relation to the comparison samples.

EXAMPLE 3

A standard commercial-grade anatase pigment aftertreated with aluminum oxide and an organic compound was used for the preparation of 72% aqueous suspension. 2-Phosphonobutane-1,2,4-tricarboxylic acid (PBA-AM) and a low molecular weight carboxylic acid (commercial product) were used as dispersants. In order to test the dependence upon the amount added, different quantities were used.

The suspension was prepared and tested in the same way as in Example 1. In addition, in the present example, the viscosity was also determined by means of a rotary viscosimeter (Rheomat 15, a product of the Contraves company, Switzerland), where possible at the same or at the highest possible shear velocity.

The results are shown in Table 4 below. They show that as little as 0.05%, better still 0.1%, of the wetting agents according to the invention is sufficient to obtain a low viscosity storable slurry. Even when added in larger quantities, the comparison wetting agent does not give such good suspensions. This example also shows that additions of wetting agent larger than the optimum lowest addition does not produce any adverse effects. It is known that overdosage can result in reflocculation, as also shown by the comparison substance. Accordingly, the quantity of wetting agent is uncritical over a wide range where the phosphonocarboxylic acid is used.

EXAMPLE 4

A rutile pigment aftertreated with aluminum oxide and an organic compound was produced and tested in the same way as in Examples 1 and 3.

In addition to the wetting agents mentioned in those examples, a standard commercial-grade wetting agent based on polyphosphate and another based on aminotrimethylene phosphonic acid were included in the tests. The test results are shown in Table 5. With 0.2 to 0.3% of the compound according to the invention, it is possible to prepare fluid and, above all, storable suspensions. The comparison wetting agents produce slurries with higher viscosities and/or poorer stability in storage.

EXAMPLE 5

A standard commercial-grade precipitated barium sulphate was used in the production of the following slurries. Production and testing were carried out in the same way as in Examples 1 and 3.

The results are shown in Table 6. Only the slurries containing the two substances according to the invention, namely 2-phosphonobutane-1,2,4-tricarboxylic acid and phosphonosuccinic acid, could still be redispersed after storage for 4 weeks in order to measure the viscosities. In the case of the comparison samples, the sediment was so hard and solid that it could no longer be redispersed.

EXAMPLE 6

Even with a standard commercial-grade talcum, it is possible to produce fluid suspensions by means of wetting agents. Preparation and testing were carried out in the same way as in Examples 1 and 3. The results and the wetting agents used are shown in Table 7.

The substances according to the invention, namely 2-phosphonobutane-1,2,4-tricarboxylic acid and phosphonosuccinic acid, give lower viscosities than the comparison samples for the same quantity of wetting agent. The blank sample behaves distinctly more poorly.

Table 4

Fluidity and stability in storage of a 72% suspension of an aftertreated anatase pigment in dependence upon the quantity of wetting agent

| Wetting agent | Quantity % | pH | Viscosity/shear vel. after 1 d Pa.s Pascal | $s^{-1}$ sec | after 28 d Pa.s | $s^{-1}$ | Flowout time from a DIN-4-cup after 1 d (s) | Sediment after 8 d g | 21 d g |
|---|---|---|---|---|---|---|---|---|---|
| Blank sample | 0 | approx. 8 | 0.41 | 137.1 | 5.90 | 93.3 | 26.2 | 300 | 300 |
| 2-phosphonobutane tricarboxylic acid | 0.05 | approx. 8 | 0.063 | 148.3 | 0.566 | 103.9 | 12.3 | 170 | 300 |
| | 0.10 | approx. 8 | 0.042 | 148.2 | 0.102 | 111.2 | 12.5 | 14 | 104 |
| | 0.20 | approx. 8 | 0.041 | 148.2 | 0.032 | 111.2 | 12.2 | 13 | 39 |
| | 0.30 | approx. 8 | 0.058 | 148.3 | 0.051 | 111.2 | 13.6 | 11 | 33 |
| | 0.40 | approx. 8 | 0.067 | 148.3 | 0.083 | 111.2 | 13.4 | 15 | 38 |
| Low molecular weight Carboxylic acid | 0.05 | approx. 8 | 0.289 | 111.2 | 3.28 | 98.3 | nm | 300 | 300 |
| | 0.10 | approx. 8 | 0.296 | 103.9 | 1.70 | 98.3 | nm | 300 | 300 |
| | 0.20 | approx. 8 | 0.589 | 103.9 | 0.647 | 103.9 | nm | 300 | 300 |
| | 0.30 | approx. 8 | 1.101 | 98.3 | 1.35 | 98.3 | nm | 300 | 300 |
| | 0.40 | approx. 8 | 0.909 | 103.9 | 1.62 | 98.3 | nm | 300 | 300 | nm = not measurable

Table 5

Fluidity and stability in storage of a 72% suspension of an aftertreated rutile pigment in dependence upon the quantity of wetting agent

| Dispersant | Quantity % | Visc./shear vel.after 1 d Pa.s | $s^{-1}$ | after 28 d Pa.s | $s^{-1}$ | Flowout time from a DIN-4-cup after 1 d (s) | Sediment after 8 d g | 21 d g | pH appr. |
|---|---|---|---|---|---|---|---|---|---|
| Blank sample | 0 | 14.4 | 98.3 | 39.0 | 42.45 | nm | 300 | 300 | 8 |
| 2-phosphonobutane tricarboxylic acid | 0.1 | 408 | 98.3 | 16.1 | 98.3 | nm | 300 | 300 | 8 |
| | 0.2 | 0.255 | 111.2 | 3.43 | 98.3 | 19.2 | 48 | 175 | 8 |
| | 0.3 | 0.049 | 111.2 | 0.13 | 111.2 | 12.4 | 8 | 89 | 8 |
| | 0.4 | 0.067 | 111.2 | 0.095 | 111.2 | 13.1 | 16 | 32 | 8 |
| Polyphosphate | 0.1 | 11.0 | 98.3 | 35.0 | 42.45 | nm | 300 | 300 | 8 |
| | 0.2 | 2.38 | 98.3 | 17.1 | 98.3 | nm | 300 | 300 | 8 |
| | 0.3 | 0.145 | 111.2 | 0.584 | 10.39 | 13.6 | 300 | 300 | 8 |
| | 0.4 | 0.083 | 111.2 | 0.205 | 10.39 | 12.3 | 75 | 27 | 8 |
| Low molecular weight carboxylic acid | 0.1 | 9.52 | 98.3 | 11.9 | 98.3 | nm | 300 | 300 | 8 |
| | 0.2 | 2.35 | 98.3 | 4.78 | 98.3 | nm | 300 | 300 | 8 |
| | 0.3 | 2.21 | 98.3 | 2.45 | 98.3 | nm | 300 | 300 | 8 |
| | 0.4 | 1.79 | 98.3 | 2.10 | 98.3 | nm | 300 | 300 | 8 |
| Aminotrimethylene phosphonic acid | 0.1 | 6.54 | 98.3 | 14.3 | 98.3 | nm | 300 | 300 | 8 |
| | 0.2 | 0.26 | 111.2 | 2.04 | 98.3 | 19.0 | 300 | 300 | 8 |
| | 0.3 | 0.072 | 111.2 | 0.14 | 111.2 | 13.8 | 8 | 80 | 8 |
| | 0.4 | 0.056 | 111.2 | 0.072 | 111.2 | 13.0 | 10 | 80 | 8 | nm = not measurable

Table 6

Fluidity of 81% aqueous barium sulphate suspensions containing different wetting agents

| Wetting agent | Quantity % | Visc./shear vel. after 1 d Pa.s | $S^{-1}$ | after 28 d Pa.s | $s^{-1}$ | Flowout time from a DIN-4-cup after 1 d(s) | pH approx. |
|---|---|---|---|---|---|---|---|
| Blank sample | 0 | 6.33 | 98.3 | nm+ | | nm | 8 |
| 2-Phosphonobutane tricarboxylic acid | 0.3 | 0.041 | 111.2 | 0.60 | 137.1 | 3.4 | 8 |
| Phosphonosuccinic acid | 0.3 | 0.057 | 111.2 | 0.094 | 111.2 | 3.4 | 8 |
| Aminotrimethylene phosphonic acid | 0.3 | 0.057 | 111.2 | nm+ | | 4.1 | 8 |
| Polyphosphate | 0.3 | 0.038 | 111.2 | nm+ | | 3.6 | 8 |
| Low molecular weight | | | | | | | |

Table 6-continued

Fluidity of 81% aqueous barium sulphate suspensions containing different wetting agents

| Wetting agent | Quantity % | Visc./shear vel. after 1 d Pa.s | s$^{-1}$ | after 28 d Pa.s | s$^{-1}$ | Flowout time from a DIN-4-cup after 1 d(s) | pH approx. |
|---|---|---|---|---|---|---|---|
| carboxylic acid | 0.3 | 0.129 | 111.2 | nm+ | | 3.6 | 8 | nm = not measurable
+non-redispersible sediment

Table 7

Fluidity of 47% aqueous talcum suspensions containing different wetting agents

| Wetting agent | Quantity % | Visc./shear vel. after 1 d Pa.s | s$^{-1}$ | after 28 d Pa.s | s$^{-1}$ | Flowout time from a DIN-4-cup after 1 d (s) | pH approx. |
|---|---|---|---|---|---|---|---|
| Blank sample | 0 | 0.73 | 43.45 | 0.53 / | 137.1 | 10.2 | 8 |
| 2-phosphonobutane tricarboxylic acid | 0.3 | 0.18 | 84.5 | 0.30 / | 111.2 | 6.8 | 8 |
| Phosphonosuccinic acid | 0.3 | 0.27 | 84.5 | 0.31 / | 137.1 | 6.7 | 8 |
| Aminotrimethylene phosphonic acid | 0.3 | 0.66 | 43.3 | 0.47 / | 137.1 | 11.4 | 8 |
| Low molecular weight carboxylic acid | 0.3 | 0.30 / | 111.2 | 0.43 / | 137.1 | 14.1 | 8 |

It will be appreciated that the instant specification and examples are set forth by way of illustration and not limitation, and that various modifications and changes may be made without departing from the spirit and scope of the present invention.

What is claimed is:

1. In an aqueous fluid dispersible pigment suspension containing a dispersion aid, the improvement which comprises employing as the dispersion aid about 0.01 to 1% by weight, based on pigment solids, of a phosphonocarboxylic acid or a salt thereof.

2. A suspension as claimed in claim 1, wherein the phosphonocarboxylic acid is of the formula

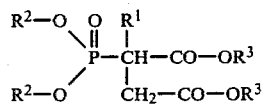

in which
R$^1$ is hydrogen, or C$_{1-4}$-alkyl radical, and
R$^2$ and R$^3$ each independently is hydrogen or C$_{1-3}$-alkyl.

3. A suspension as claimed in claim 1, wherein the phosphonocarboxylic acid is phosphonobutane-1,2,4-tricarboxylic acid.

4. A suspension as claimed in claim 1, wherein the material suspended comprises TiO$_2$.

5. A suspension as claimed in claim 1, wherein the material suspended is present in a concentration of about 30 to 80% by weight.

6. A suspension as claimed in claim 5, wherein the material suspended comprises TiO$_2$, the dispersion aid comprises phosphonobutane-1,2,4-tricarboxylic acid or a salt thereof in about 0.05 to 0.5% by weight based on solids, and the suspension further contains an amine or alkanolamine in about 0.05 to 1% by weight based on solids.

7. A process for the production of a fluid aqueous suspension of a pigment from a filter cake thereof, comprising mixing said filter cake with about 0.01 to 1% by weight of a phosphonocarboxylic acid or salt thereof, and adjusting the water content of the mixture to from about 30 to 80% by weight to produce a fluid suspension.

8. In the processing and transport of an aqueous suspension of a filler or pigment containing an amine or alkanolamine as a dispersion aid, the improvement which comprises additionally including in the suspension about 0.01 to 1% by weight, based on filler or pigment solids, of a phosphonocarboxylic acid or a salt thereof, whereby settling of the solids in the suspension is reduced along with the viscosity.

9. A suspension as claimed in claim 8, wherein the phosphonocarboxylic acid is of the formula

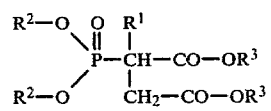

in which
R$^1$ is hydrogen, or C$_{1-4}$-alkyl radical, and
R$^2$ and R$^3$ each independently is hydrogen or C$_{1-3}$-alkyl.

10. A suspension as claimed in claim 8, wherein the phosphonocarboxylic acid is phosphonobutane-1,2,4-tricarboxylic acid.

* * * * *

UNITED STATES PATENT AND TRADEMARK OFFICE
CERTIFICATE OF CORRECTION

PATENT NO. : 4,186,028
DATED : Jan. 29, 1980
INVENTOR(S) : Peter Woditsch et al

It is certified that error appears in the above—identified patent and that said Letters Patent is hereby corrected as shown below:

Col. 4, line 18, After line 17 insert --Table 1 Fluidity and stability in storage of $TiO_2$ - suspension with a solids content of 72%--.

Signed and Sealed this

Fifth Day of May 1981

[SEAL]

Attest:

RENE D. TEGTMEYER

Attesting Officer — Acting Commissioner of Patents and Trademarks